Feb. 13, 1951          H. W. LUNDQUIST          2,541,526
CLUTCH FOR FLOOR CONDITIONING MACHINES
Filed May 19, 1950          2 Sheets—Sheet 1
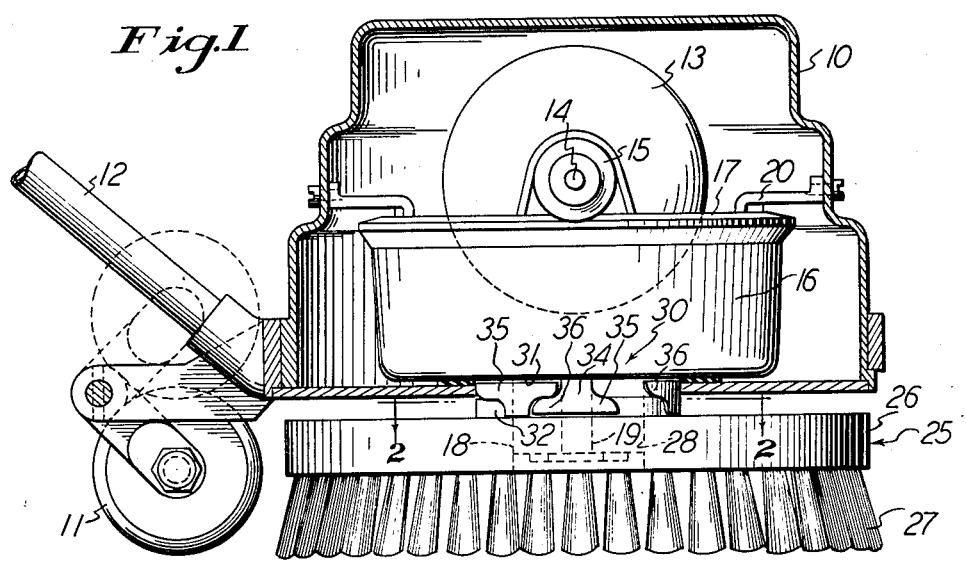
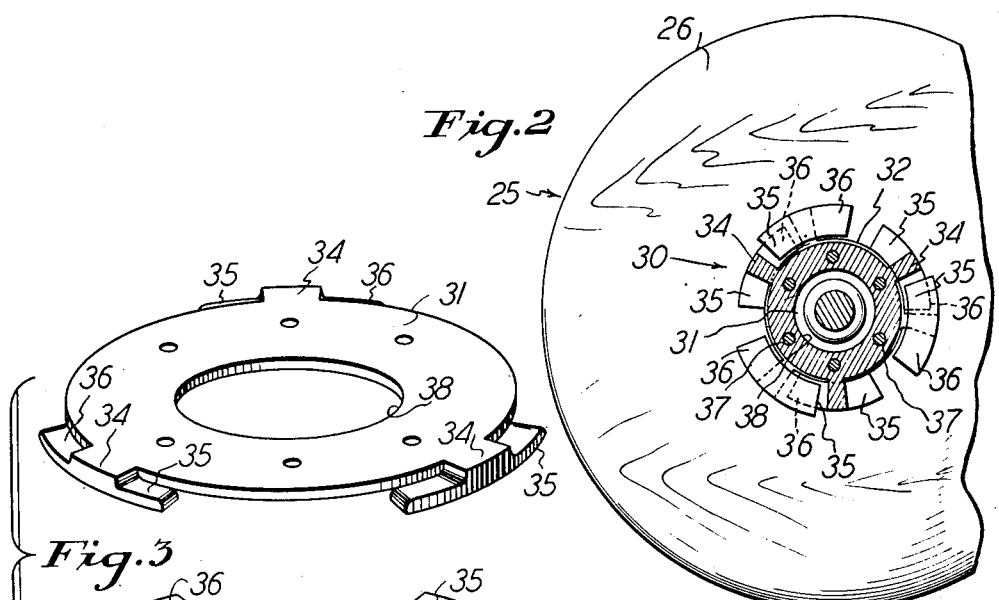
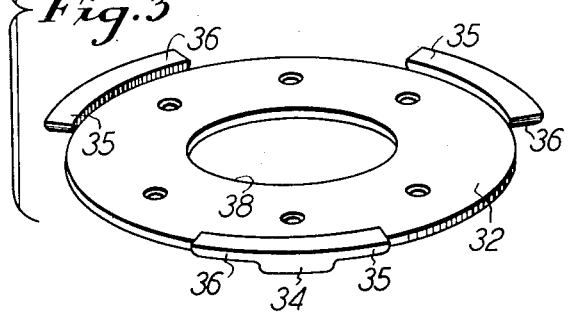
Inventor.
HENDRIK W. LUNDQUIST.
BY William E. Hall
Attorney.

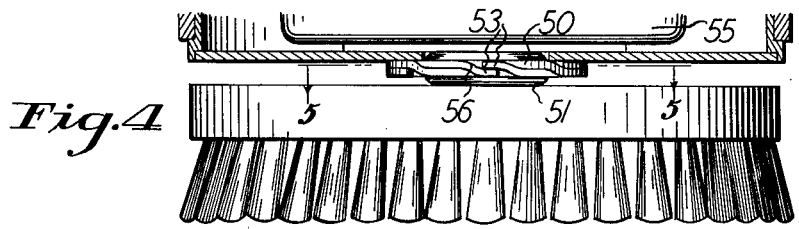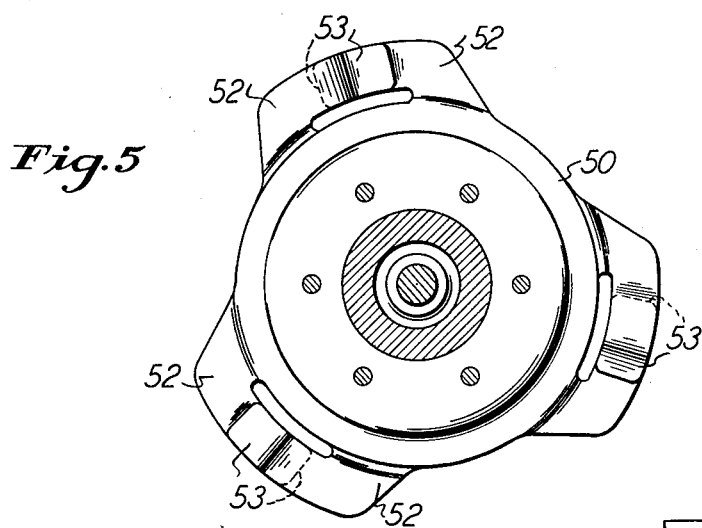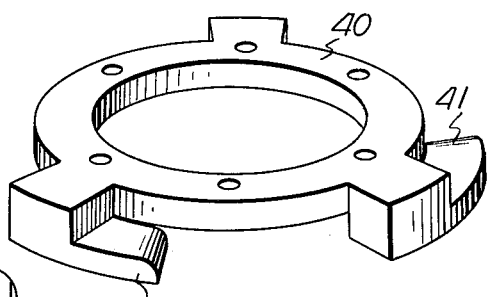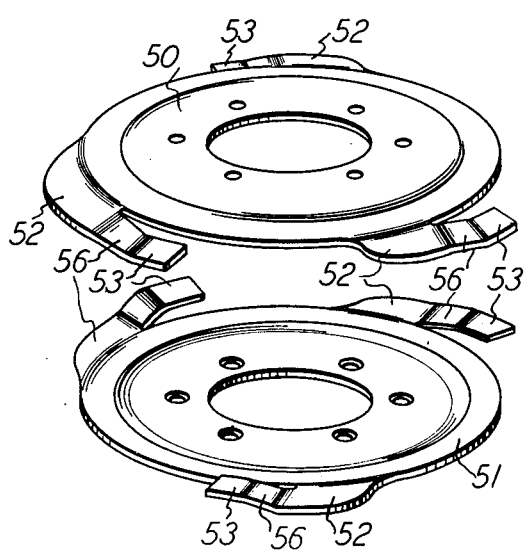
Inventor.
HENDRIK W. LUNDQUIST.
BY William B Hall
Attorney.

Patented Feb. 13, 1951

2,541,526

UNITED STATES PATENT OFFICE 2,541,526

CLUTCH FOR FLOOR CONDITIONING MACHINES

Hendrik W. Lundquist, Tujunga, Calif.

Application May 19, 1950, Serial No. 162,940

7 Claims. (Cl. 287—103)

This invention relates to clutch devices, and particularly to a combined connector and clutch device adapted for use in connecting a rotary brush to the driving shaft of a mobile floor conditioning machine. The present application is a continuation-in-part of my copending application for patent on Floor Machine, Serial No. 522,075, now Patent No. 2,508,411, filed February 12, 1944.

The floor conditioning machine disclosed in the parent application, referred to above, is adapted for use in sanding, scrubbing, and polishing floors and floor coverings. The machine consists of a housing provided with wheels and a handle by which the machine can be propelled along the floor, the machine also including an electric motor and a friction member driven by the motor and having a vertical driving shaft. The shaft is adapted to carry, at its lower end, any of a series of floor conditioning elements, each of which includes a circular plate provided on its under surface with sandpaper, scrubbing bristles, or a suitable buffer pad. Since each of the floor conditioning elements must be detachable from the shaft so as to be readily replaceable by an element of a different character, a specially designed connecting and clutch means must be provided between the driving shaft and the element.

The present invention is directed to such a connecting and clutching means, and it is an important object to provide a two-part clutch, the elements or discs of which are identical, one disc being carried by the driving shaft and the companion element being mounted on the floor conditioning implement, the clutch discs having fingers adapted to interengage when the implement is manually rotated in the direction of rotation of the driving shaft so as to positively maintain the implement connected to the shaft for rotation thereby, the fingers being disengageable upon rotation of the implement in the direction opposite to the direction of normal rotation of the driving shaft so as to permit disconnection of the implement.

Another object of the present invention is to provide a clutch device of the character referred to in which the companion elements or discs thereof may be made with clutching fingers extending in either or both circumferential directions. In the former case, the fingers of the two discs extend in opposite directions and hook, one over the other, to effect a positive driving connection. In the latter case each disc has a plurality of radial lugs, each of which has oppositely directed clutch fingers so that clutching engagement of the fingers of the two discs is effected when the driving shaft is rotated in either direction.

Another object is to provide a clutch device of the type indicated in which the discs thereof are adapted for manufacture as either metal castings or metal stampings. A related object is to provide such discs which are interchangeable, one with another. Another object in this respect is to provide clutch discs which are particularly strong and durable, and discs which are readily applied to the driving member and to the discs of the floor conditioning implements.

Further objects and advantages will appear from the following description and from the drawings which illustrate several preferred embodiments of the clutch device, and in which:

Fig. 1 is a view, partly in section, of a floor conditioning machine having a rotary brush implement connected to be rotated by the motor drive by means of the present improved clutch device;

Fig. 2 is a sectional plan view of the clutch device, taken on line 2—2 of Fig. 1;

Fig. 3 is an enlarged composite perspective view of the two clutch discs of the clutch device shown in Figs. 1 and 2;

Fig. 4 is a fragmentary side view, partly in section, of the lower portion of the floor conditioning machine, showing a clutch of alternative construction;

Fig. 5 is an enlarged sectional plan view, taken on line 5—5 of Fig. 4;

Fig. 6 is an enlarged composite perspective view of the clutch elements employed in the alternative device shown in Figs. 4 and 5; and, Fig. 7 is a perspective view of a clutch disc of further modified construction.

Referring first to Fig. 1, the floor conditioning machine shown therein is of the same general type as that disclosed in my prior application referred to previously, and will be described only briefly as relating to the function of the present clutch device. The machine comprises, in general, a dome-like housing 10 having wheels 11 and a handle 12 by which the machine can be moved along the floor to be conditioned. Mounted within the housing 10 is an electric motor 13 having a horizontal armature shaft 14, which carries a tapered drive member 15 in the form of a small pulley or wheel. A dish-shaped driven member 16 is rotatable within the housing 10 on a vertical axis and has an upper conical rim 17 which is engaged and driven by the drive member 15 of the motor 13. The member 16 has a depending hub 18 which is rotatably supported from a fixed spindle 19 of a frame 20 secured within the housing 10.

Adapted to be connected for rotation with the driven member 16 is a floor conditioning implement 25 which, as shown in Fig. 1, is exemplified in a rotary scrubbing brush, the implement comprising a disc or plate 26 which is provided with downwardly projecting bristles 27. The disc 26 has an axial aperture 28 to adapt the disc to surround the hub 18 of the driven member 16.

The brush implement 25 is connected for rotation with the driven member 16 by means of a clutch device, indicated generally at 30. The clutch device comprises a pair of clutch disc elements 31 and 32 of identical construction. As shown best in Fig. 3, each disc 31 and 32 has a plurality, in the present instance three, of radially projecting lobes or lugs 34, one of the faces of the lugs being aligned with one surface of the disc and the opposite face projecting beyond the other face of the disc. The lugs 34 are T-shaped in side elevation, and thus are formed with clutch fingers 35 and 36 which extend in opposite circumferential directions, the fingers being of less thickness than the central portions of the lugs and projecting beyond the faces of the discs which are arranged in juxtaposition when the clutch is applied to use in the machine.

Each disc is provided with countersunk apertures for receiving screws 37 by which the discs 31 and 32 are secured, respectively, to the lower surface of the driven member 16 and to the upper surface of the circular disc plate 26 of the brush implement 25. The companion clutch discs 31 and 32 have axial openings 38 to adapt them to surround the hub 18 of the driven member 16.

Assuming the clutch discs 31 and 32 to be attached, respectively, to the driven member and the brush implement, to detachably connect the implement to the driven member for rotation therewith, the discs 31 and 32 are turned relative to each other to align the clutch lugs 34 of the lower disc with the spaces between the lugs 34 of the upper disc. The lower disc 32 is then moved upwardly until its upper face meets the lower face of the upper disc 31. At this juncture, the lower disc 32 is manually rotated with respect to the upper disc 31, in the direction opposite to the direction in which the upper disc is to be rotated by the motor 13.

Rotation of the lower disc 32 in, for example, clockwise direction (as viewed from above) causes its clutch fingers 36 to move into overlying relation to the fingers 35 of the upper disc 31 and to frictionally grip the same. The two discs 31 and 32 are thus connected for unitary rotation without the use of separate connecting means. The above procedure is followed when the driven member is to be driven in counterclockwise direction (as viewed from above). When the normal rotation of the driven member is clockwise, the above procedure is reversed, the lower disc 32 being rotated manually in counterclockwise direction to cause its fingers 35 to overlie the fingers 36 of the upper disc, such a relationship being shown in Fig. 2.

Assuming that during operation of the machine the driving member 16 is rotated in clockwise direction (Fig. 2), the clutch fingers 36 of the upper disc 31 tend to move under the fingers 35 of the lower clutch disc 31 to a greater extent so that a positive driving connection is effected and the brush implement is rotated in unison with the driven member. When it is desired to replace the brush implement with a sanding or polishing element, the clutch discs are merely rotated relative to each other in directions opposite to the rotative movement imparted to the discs to connect the same, a light tap against the lugs initiating this movement. Upon such disconnection, the substitute implement having a similar disc 32 is applied to the machine by the procedure explained above.

In some floor conditioning machines, a pair of driven members and rotary implements are employed, these members being rotated by a single motor in opposite directions. In such machines, the lower discs 32 are merely rotated in opposite directions to connect them with their companion upper discs 31. It is thus seen that by providing the clutch discs 31 and 32 with T-shaped lugs having oppositely directed clutch fingers, the discs can be utilized for either right or left-hand drives.

It is within the present concept, however, to provide clutch discs which have their fingers extending in only one direction, such a disc 40 being shown in Fig. 7. As will be observed, the disc 40 has three circumferentially extending clutch fingers 41 which are directed in counterclockwise direction, this disc, when secured to the driven member, being rotated in counterclockwise direction to drive a lower disc of identical contour secured to the implement and disposed with its fingers overlying the fingers of the upper disc 40.

The clutch discs 31, 32, and 40, described above, are made as metal castings. However, the invention also contemplates the use of a clutch device comprising a pair of mating discs which are made as metal stampings. Such discs 50 and 51 are illustrated in Figs. 4 to 6, inclusive. In this modification, each disc has three L-shaped projections 52, each of which has a clutch finger 53 extending in a circumferential direction, the fingers of the upper disc 50 extending in the direction of rotation of the drive member 55 to which it is attached by screws. As will be seen by reference to Fig. 6, the free ends of the fingers 53 are depressed out of the plane of the disc so that the fingers of the mating discs hook together, as shown in Figs. 4 and 5, the fingers having inclined surfaces 56 which, when in contact, provide a wedging action to effect a positive drive.

A floor conditioning machine, such as that illustrated in the present drawings, may be equipped with a clutch disc 31, 40, or 50, and the floor conditioning elements may be provided with a disc of any of the types disclosed herein, since the discs are so proportioned that they are interchangeable. For example, a disc of the type shown in Fig. 6 may be used with a disc such as illustrated in Fig. 3 or Fig. 7. Likewise, a disc of the character illustrated in Fig. 7 may be utilized to advantage with discs of the type shown in Figs. 3 and 6.

Though I have shown and described a particular construction, combination, and arrangement of parts, and certain modifications thereof, I do not wish to be limited in this respect, but desire to include in the scope of my invention the construction, combination, and arrangement substatially as set forth in the following claims.

I claim:

1. In a machine of the class described, a rotating member, a rotatably driven member, and a clutch non-rotatably securing the latter to the former, said clutch comprising a plurality of L-shaped fingers on the rotating member and a corresponding number of L-shaped fingers on the driven member, the fingers on the rotating member being circumferentially spaced about the rotating axis thereof and projecting radially therefrom, the lateral portions of said fingers being spaced from the rotating member and all extending in the same direction circularly about the axis, the fingers on the driven member being also of L-shape and similarly spaced about the rotating axis thereof and projecting radially from the periphery of the same, the second fingers being arranged in reverse positions from the first fingers, the lateral portions of the second fingers being adapted to lock behind the lateral portions of the corresponding first fingers, the lateral portions of the fingers of one set being bendable inwardly to adjust the space for the reception of the lateral portions of the fingers of the other set.

2. A clutch for use in connecting a first member and a second member for unitary rotation, comprising a pair of clutch discs, one disc being connected to the first member and the other disc being connected to the second member, each clutch disc having a circular portion and fingers projecting radially from its periphery, said fingers having portions extending in the same direction and concentrically of the axis of the disc with their free ends offset out of the plane of the disc and disposed parallel thereto, said clutch discs being adapted to be disposed coaxial in face-to-face engagement and the fingers of the discs being adapted to engage one another upon relative rotation between the discs so as to effect a driving connection between said first and second members.

3. A clutch for use in connecting a first member and a second member for unitary rotation, comprising a pair of clutch discs, one disc being connected to the first member and the other disc being connected to the second member, each clutch disc having a circular portion and lugs projecting radially from its periphery, each lug having at least one finger extending concentrically of the axis of the disc, the free ends of said fingers being disposed out of the plane of the disc and extending parallel thereto, said clutch discs being adapted to be disposed coaxial in face-to-face engagement and the fingers of the discs being adapted to engage one another upon relative rotation between the discs so as to effect a driving connection between said first and second members.

4. A clutch for use in connecting a first member and a second member for unitary rotation, comprising a pair of clutch discs, one disc being connected to the first member and the other disc being connected to the second member, each clutch disc having a circular portion and resilient fingers projecting radially from its periphery, said fingers having portions extending in the same direction and concentrically of the axis of the disc with their free ends offset out of the plane of the disc and disposed parallel thereto, said clutch discs being adapted to be disposed coaxial in face-to-face engagement with the fingers of the discs extending in opposite directions, said fingers being adapted to frictionally engage one another upon relative rotation between the discs so as to effect a driving connection between said first and second members.

5. A clutch of the character defined in claim 3, in which each lug of each disc is L-shaped in side view and has one of said clutch fingers, the fingers of the lugs of each disc extending in the same circumferential direction, the fingers of each disc having intermediate inclined cam portions engageable by the ends of the fingers of the other disc.

6. A clutch for use in connecting a first member and a second member for unitary rotation, the first member being a driving member and the second member being a driven member, said clutch including a first clutch disc secured to the first member and a second clutch disc secured to the second member, said discs being identical and each having a plurality of lugs projecting radially therefrom, each lug having an integral, resilient clutch finger extending circumferentially and concentrically of the axis of the disc, the fingers of the first disc extending in the direction of rotation of said first member and the fingers of the second disc extending in the opposite direction, the free ends of the fingers of each disc being offset from the plane of the disc and disposed parallel thereto, said discs being in face-to-face relationship with the free ends of the fingers of each disc overlying and frictionally engaging the ends of the fingers of the other disc to provide a driving connection.

7. In a machine of the class described, a rotating member, a rotatably driven member, and a clutch non-rotatably securing the latter to the former, said clutch comprising a plurality of L-shaped fingers on the rotating member and a corresponding number of L-shaped fingers on the driven member, the fingers on the rotating member being circumferentially spaced about the rotating axis thereof and projecting radially therefrom, the lateral portions of said fingers being spaced from the rotating member and all extending in the same direction circularly about the axis, the fingers on the driven member being also of L-shape and similarly spaced about the rotating axis thereof and projecting radially from the periphery of the same, the second fingers being arranged in reverse positions from the first fingers, the lateral portions of the second fingers being adapted to lock behind the lateral portions of the corresponding first fingers, the lateral portions of all of said fingers being disposed in planes substantially parallel to and offset from the planes of the rotating and driven members, said lateral portions having interengageable cam portions operative to effect frictional, clutching engagement of each pair of fingers.

HENDRIK W. LUNDQUIST.

REFERENCES CITED

The following references are of record in the file of this patent:

UNITED STATES PATENTS

| Number | Name | Date |
|---|---|---|
| 2,358,795 | Djidics et al. | Sept. 26, 1944 |
| 2,518,279 | Bruder | Aug. 8, 1950 |